United States Patent

Sato et al.

[11] Patent Number: 5,383,077
[45] Date of Patent: Jan. 17, 1995

[54] TAPE CASSETTE HAVING TAPE GUIDES MADE OF POLYETHYLENE

[75] Inventors: Shinya Sato, Miyagi; Kazuhiko Hatakawa, Kanagawa, both of Japan

[73] Assignee: Sony Corporation, Tokyo, Japan

[21] Appl. No.: 602,215

[22] Filed: Oct. 22, 1990

[30] Foreign Application Priority Data

Nov. 24, 1989 [JP] Japan .................. 1-305603
Nov. 29, 1989 [JP] Japan .................. 1-310453
Nov. 29, 1989 [JP] Japan .................. 1-310454

[51] Int. Cl.⁶ .............. G11B 15/60; G11B 23/02; C08K 3/04
[52] U.S. Cl. .............. 360/132; 360/130.21; 242/346; 242/615.4; 524/495
[58] Field of Search .............. 360/132, 130.21, 130.33, 360/132; 242/190, 198, 199, 197; 524/495, 500, 508

[56] References Cited

U.S. PATENT DOCUMENTS

| | | | |
|---|---|---|---|
| 3,939,024 | 2/1976 | Hoggatt | 428/457 |
| 4,015,985 | 4/1977 | Jones | 430/63 |
| 4,044,073 | 8/1977 | Baron et al. | 524/537 |
| 4,417,704 | 11/1983 | Oishi et al. | 242/199 |
| 4,486,320 | 12/1984 | Sakurai et al. | 252/12.6 |
| 4,557,433 | 12/1985 | Fitterer et al. | 242/190 |
| 4,635,877 | 1/1987 | Oishi et al. | 242/197 |
| 4,663,689 | 5/1987 | Okamura et al. | 242/199 |
| 4,667,261 | 5/1987 | Roos et al. | 360/130.21 |
| 4,723,723 | 2/1988 | Asahi et al. | 242/76 |
| 4,881,696 | 11/1989 | Mizutani et al. | 242/199 |
| 4,948,833 | 8/1990 | Araki et al. | 524/523 |

FOREIGN PATENT DOCUMENTS

0074033A2 3/1983 European Pat. Off. ..... G11B 15/60
0342622A2 11/1989 European Pat. Off. ..... C08L 23/06
3149441A1 7/1982 Germany .................. G11B 23/04

OTHER PUBLICATIONS

Patent Abstracts of Japan, vol. 9, No. 76 (p-348)(1799), 5 Apr. 1985 & JP-A-59 207 050 (Otsuka Kagaku Yakuhin), 24 Nov. 1984.
Patent Abstracts of Japan, vol. 11, No. 150 (C-422), 15 May 1987 & JP-A-61 285 256 (Sumitomo Electric Ind), 16 Dec. 1986.
Patent Abstracts of Japan, vol. 10, No. 276 (C-373), 10 Sep. 1986 & JP-A-61 098 767 (Taiho Kogyo), 17 May 1986.
Patent Abstracts of Japan, vol. 10, No. 199 (C-359), 11 Jul. 1986 & JP-A-61 040 357 (Otsuka Chem Co.), 26 Feb. 1986.
Patent Abstracts of Japan, vol. 11, No. 185 (C-428), 13 Jun. 1987 & JP-A-62 010 165 (Takho Kogyo), 19 Jan. 1987.

*Primary Examiner*—Stuart S. Levy
*Assistant Examiner*—Jefferson Evans
*Attorney, Agent, or Firm*—Limbach & Limbach; W. Patrick Bengtsson

[57] ABSTRACT

Tape cassette tape guides are molded from a complex material of super macromolecular weight polyethylene-based resin having a molecular weight of from 500,000 to 1,000,000 mixed with polyphenyl sulfide resin or polybutylene terephthalate resin and carbon black of 1 to 15 percent by weight in order to reduce manufacturing costs.

12 Claims, 3 Drawing Sheets

| | Super Macromolecular Weight Polyethylene Resin Plus Carbon Black | Super Macromolecular Weight Polyethylene Resin Plus PPS Resin Plus Carbon Black |
|---|---|---|
| Movement Friction Coefficient | ◎ | ◎ |
| Wear Proof Property | ◎ | ◎ |
| Rigidity | △ | ○ |
| Molding Dimension Accuracy | △ | ○ |
| Heat Resistant Property | △ | ○ |

| | Super Macromolecular Weight Polyethylene Resin Plus Carbon Black | Super Macromolecular Weight Polyethylene Resin Plus PPS Resin Plus Carbon Black |
|---|---|---|
| Movement Friction Coefficient | ◎ | ◎ |
| Wear Proof Property | ◎ | ◎ |
| Rigidity | △ | ○ |
| Molding Dimension Accuracy | △ | ○ |
| Heat Resistant Property | △ | ○ |

FIG. 5

| | Super Macromolecular Weight Polyethylene Resin Plus Carbon Black | Super Macromolecular Weight Polyethylene Resin Plus PBT Resin Plus Carbon Black |
|---|---|---|
| Movement Friction Coefficient | ◎ | ◎ |
| Wear Proof Property | ◎ | ◎ |
| Rigidity | △ | ○ |
| Molding Dimension Accuracy | △ | ○ |
| Heat Resistant Property | △ | ○ |

TAPE CASSETTE HAVING TAPE GUIDES MADE OF POLYETHYLENE

BACKGROUND OF THE INVENTION

1. Field of the Invention

The present invention generally relates to tape cassettes and, more particularly, is directed to a tape cassette having stationary tape guides made of polyethylene-based resin.

2. Description of the Prior Art

For example, a tape cassette utilized in a video deck or the like is provided with stationary tape guides which come in contact with a magnetic tape so that the movement of the magnetic tape is stabilized. The stationary tape guides are positioned at opposite ends of a front wall of the cassette casing so that the magnetic tape is extended along the front wall of the tape cassette.

Referring to FIG. 1, which shows an example of a known tape cassette, there is shown a cassette casing 1 which is generally made of acrylonitrile butadiene styrene (ABS) resin. A pair of tape reels 2 are rotatably provided within this cassette casing 1. A magnetic tape 3 is supplied from one tape reel 2, contacted with and guided by a tape guide 4, withdrawn to the outside of the front wall of the cassette casing 1, contacted with, guided by the other tape guide 4 and is then taken up by the other tape reel 2.

The tape guides 4 provided in the tape cassette are formed so as to come in contact with the rear surface of the magnetic tape (i.e., tape base side) and the tape guides are unitarily formed with the cassette casing or the tape guides are made of a plastic material (see Japanese Patent Laid-Open Gazette No. 61-110388) or made of metal and are inserted into and secured to the inside of the cassette casing.

Further, Japanese Patent Laid-Open Gazette No. 55-70976 describes such a tape cassette in which there are used as the tape guides rollers made of polybutylene terephthalate (PBT) resin.

Most of the stationary type tape guides of the prior-art tape cassettes are made of metal because the metal tape guides are relatively low friction, long wearing, and have high durability compared to the magnetic tape. In that case, however, from the very nature of the metal material, the end face of the tape guide or the cylindrical face of the tape guide must be finished by a mechanical finishing-process. This brings about the following shortcomings and disadvantages:

1. The tape guides become very expensive;
2. A highly sophisticated technique is required to increase the accuracy in the surface-finishing process thereof. That is, if the surface of the tape guide is made too smooth, then electrification occurs, due to the build up of a static charge, to electrically attract the magnetic tape to the tape guide. Conversely, if the surface of the tape guide is too rough, the magnetic tape will be frequently damaged due to friction with the tape guide; and
3. If a convex shaped scratch occurs on the surface of the tape guide, the material of the tape guide is hard so that the magnetic tape will be damaged considerably. That is, it becomes very important to inspect the tape guides as products.

OBJECTS AND SUMMARY OF THE INVENTION

Accordingly, it is an object of the present invention to provide an improved tape cassette having tape guides made of polyethylene in which the aforenoted shortcomings and disadvantages of the prior art can be substantially eliminated.

More specifically, it is an object of the present invention to provide a tape cassette having tape guides made of polyethylene which can be made at low cost.

Another object of the present invention is to provide a tape cassette having tape guides made of polyethylene in which it is unnecessary to employ a surface-finishing process requiring a high degree of technical difficulty.

A further object of the present invention is to provide a tape cassette having tape guides made of polyethylene in which the inspection of products can be simplified.

As a first aspect of the present invention, a tape cassette is provided with tape guides made of super macromolecular weight polyethylene-based resin whose molecular weight falls in a range of from 500,000 to 1,000,000.

As a second aspect of the present invention, a tape cassette is provided with tape guides made of super macromolecular weight polyethylene-based resin whose molecular weight falls in a range of from 500,000 to 1,000,000 and polyphenyl sulfide resin.

In accordance with a third aspect of the present invention, a tape cassette having tape guides made of super macromolecular weight polyethylene-based resin whose molecular weight falls in a range of from 500,000 to 1,000,000 and polybutylene terephthalate resin.

The above, and other objects, features and advantages of the present invention will be apparent in the following detailed description of the preferred embodiments when read in conjunction with the accompanying drawings, in which like reference numerals are used to identify the same or similar parts in the several views.

BRIEF DESCRIPTION OF THE DRAWINGS

FIG. 5 is a table used to explain the present invention.

DETAILED DESCRIPTION OF THE PREFERRED EMBODIMENTS

Figure 1:
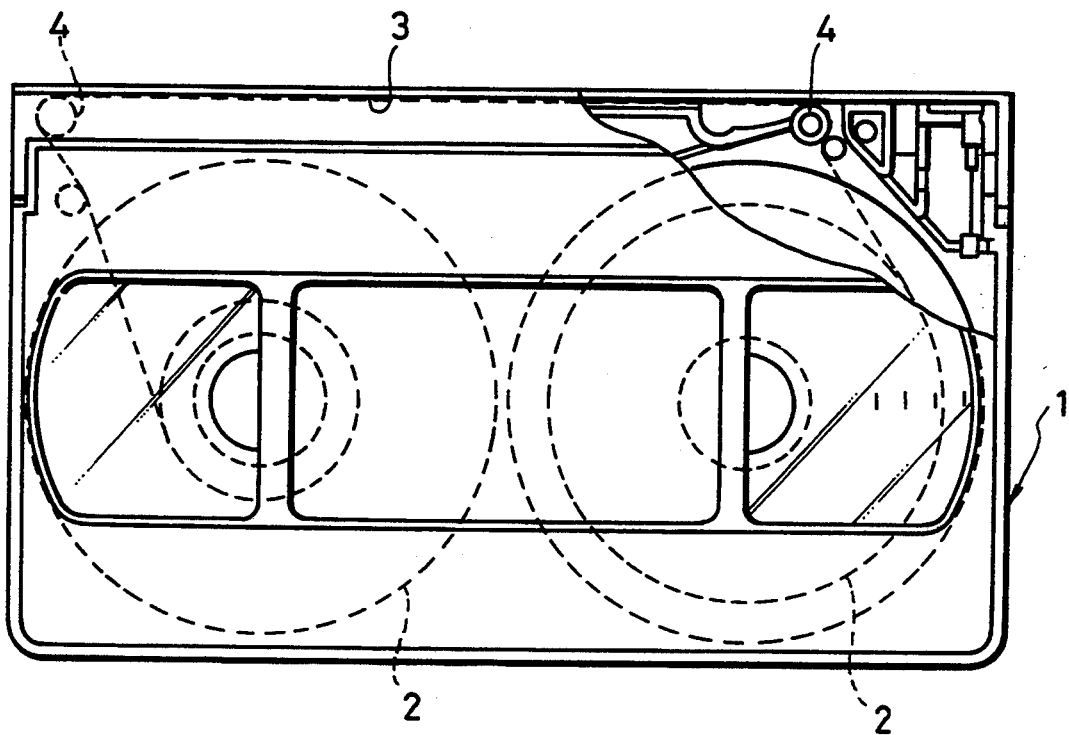
FIG. 1 is a plan view of a conventional tape cassette, and to which reference will be made in explaining the function of tape guides thereof.
Figure 2:
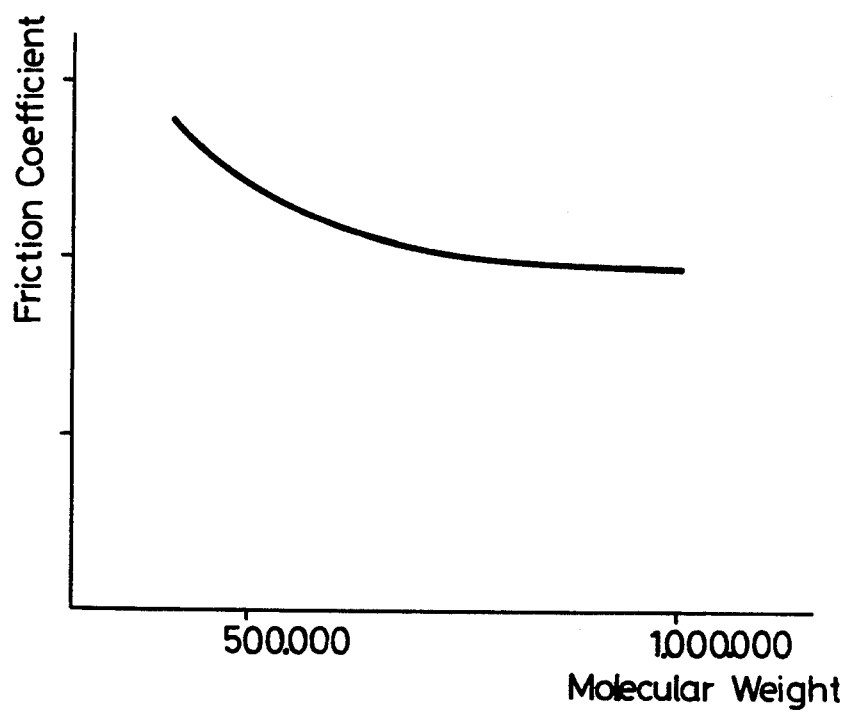
FIG. 2 is a graph of a molecular weight versus friction coefficient characteristic used to explain a first embodiment of the present invention.

Referring to the drawings in detail, and initially to FIGS. 2 and 3 thereof, a first embodiment of the present invention will be described hereinafter.

The most effective way of removing the first disadvantage of the prior art is to change the material from metal to resin and to mold the resin tape guide. The applicants have experimented with sample, stationary tape guides molded from various resins, and have found that the friction and abrasion relative to the magnetic tape are large. A suitable resin for tape guides was difficult to find. However, as a result of experiments repeatedly performed, it became clear that a friction characteristic and quality equivalent to those of the metal tape guide could be obtained by the combination of a polyethylene-based resin of super molecular weight and carbon black.

Preferably, the molecular weight of super molecular weight polyethylene-based resin falls in a range of from 500,000 to 1,000,000. If the molecular weight is smaller than 500,000, the magnetic tape is damaged considerably, and the friction coefficient tends to increase as shown in FIG. 2. Further, if the molecular weight is larger than 1,000,000, then the molding-process thereof becomes difficult and a tape guide of such resin is too soft from a mechanical strength standpoint and the tape guide is easily deformed.

The mixing ratio between the super macromolecular weight polyethylene-based resin and carbon black is in a range of from 1 to 15 percent by weight and the surface electrical resistance is $10^2$ to $10^{12}$ $\Omega$. If the mixing ratio and the surface electrical resistance are selected as described above, the super macromolecular weight polyethylene-based resin presents stable characteristics.

Polyacetals (polyoxymethylene-POM) are frequently utilized as a slidable resin material. Polyacetals bring about serious tape damage from friction relative to the tape and tend to increase drop-out, fluctuation of level and so on. Further, in the case of polyacetals, depending on the tape base material, the friction coefficient relative to the number of tape running is rapidly increased as shown in FIG. 3 with the result that the movement of the tape is stopped. However, the combination of super macromolecular weight polyethylene-based resin with the carbon black overcomes these problems. The friction coefficient relative to the number of tape running for this combination is presented as shown in FIG. 3.

As a result of the applicant's investigations, it was noted that of the super macro molecular polyethylene-based resins, LUBMER (trade name) manufactured by Mitsui Petrochemical Industries, Ltd., achieved the most powerful effects. The tape guides molded by this resin can remove the second and third defects of the prior art mentioned above because the surface finishing thereof becomes satisfactory and the uneven surface condition can be removed. This allows the inspection process of products to be simplified. Even if a convex-shaped scratch exists on the surface of the tape guide, the tape guide is soft because of the nature of the resin so that damage to the magnetic tape is suppressed to a minimum.

As described above, according to the first embodiment of the present invention, since the tape guide is made by the super macromolecular polyethylene-based resin having a molecular weight of 500,000 to 1,000,000, the manufacturing cost of the tape guide can be reduced and it is unnecessary to provide a surface finishing requiring a high degree of technical difficulty. In addition, the inspection-process of the product can be simplified.

Further, according to the experimental results, it was concluded that a good friction characteristic and quality of the tape guide can be maintained by the combination of the super macromolecular weight polyethylene-based resin, polyphenyl sulfide (PPS) resin and carbon black.

The mixing ratio of PPS resin is in a range of from 5 to 40 percent by weight, the mixing ratio of carbon black is in a range of from 1 to 15 percent by weight and the surface electrical resistance is in a range of from $10^2$ to $10^{12}$ $\Omega$ with stable characteristics being achieved.

As a result of examination, it was again noted that as the super macro molecular polyethylene-based resin, LUBMER (trade name) manufactured by Mitsui Petrochemical Industries, Ltd., achieved the most powerful effects.

Figures 3, 4:
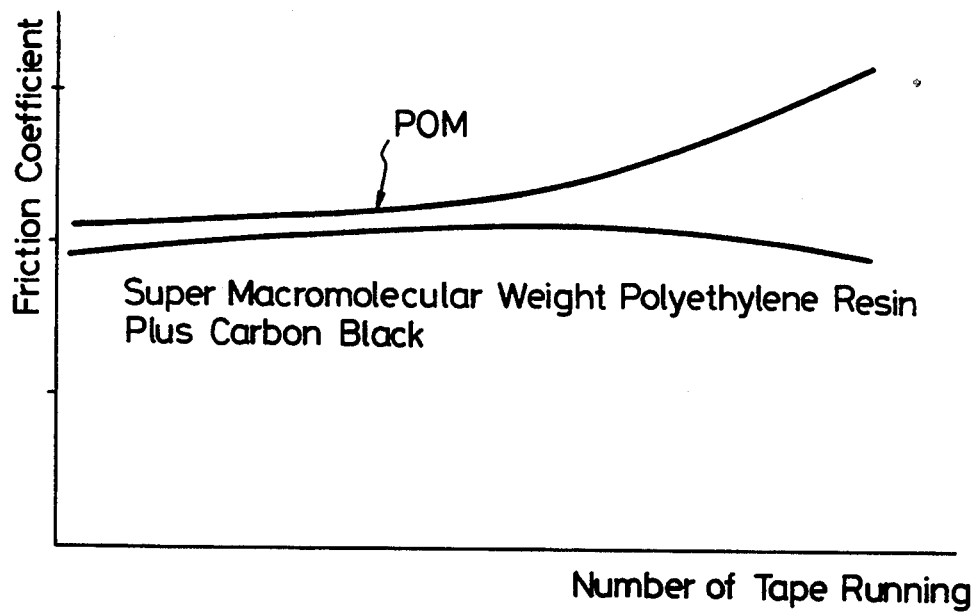
FIG. 3 is a graph of the number of tape running versus friction coefficient characteristic used to explain the first embodiment of the present invention.
FIG. 4 is a table used to explain the present invention.

As is clear from FIG. 4, the PPS resin can compensate for the disadvantage of the super macromolecular weight polyethylene-based resin in which it is too soft and it is inferior in form accuracy, and can form the tape guide without degrading the sliding characteristic thereof. In FIGS. 4 and 5, an open circle having an open circular center represents an excellent result, an open circle represents a good result and an open triangle represents an ordinary result.

As described above, according to the second embodiment of the present invention, since the tape guide is made by the combination of super macromolecular polyethylene-based resin having a molecular weight of 500,000 to 1,000,000 and polyphenyl sulfide resin, the manufacturing cost of the tape guide can be reduced and no surface finishing requiring a high degree of technical difficulty is necessary. In addition, the inspection-process of the product can be simplified.

Furthermore, according to the experimental results of a third embodiment according to the present invention, it was concluded that a good friction characteristic and quality of the tape guide can be maintained by the combination of the super macromolecular weight polyethylene-based resin, polybutylene terephthalate (PBT) resin and carbon black.

The mixing ratio of PBT resin is in a range of from 5 to 40 percent by weight, the mixing ratio of carbon black is in a range of from 1 to 15 percent by weight and the surface electrical resistance is in a range of from $10^2$ to $10^{12}$ $\Omega$ with stable characteristics being achieved.

According to the combination of super macromolecular weight polyethylene-based resin, the PBT resin and the carbon black of the third embodiment, the friction coefficient relative to the number of tape running is presented as shown in FIG. 3, and thus the above-mentioned shortcomings can be overcome.

As described above, according to the third embodiment of the present invention, since the tape guide is made by the combination of super macromolecular polyethylene-based resin having a molecular weight of 500,000 to 1,000,000 and PBT resin, the manufacturing cost of the tape guide can be reduced and a surface finishing requiring a high degree of technical difficulty is unnecessary. In addition, the inspection-process of the product can be simplified.

The applicants have found that suitable commercially available resins for practicing this invention are M2900 brand polyphenyl sulfide resin manufactured by Toray-Philips of Japan and PBT 1100P brand polybutylene terephthalate resin manufactured by Toray.

Having described the preferred embodiments of the invention with reference to the accompanying drawings, it is to be understood that the invention is not limited to those precise embodiments and that various changes and modifications thereof can be effected by one skilled in the art without departing from the spirit or scope of the novel concepts of the invention as defined in the appended claims.

We claimed as our invention:

1. A tape cassette having tape guides comprised of a mixture of polyethylene-based resin whose molecular weight falls in a range of from 500,000 to 1,000,000 and polyphenyl sulfide resin.

2. A tape cassette having tape guides according to claim 1, wherein the tape cassette further comprises a front wall and the tape guides are used as respective end guides by which a tape is extended along the front wall.

3. A tape cassette having tape guides according to claim 2, wherein the tape guides are stationary tape guides.

4. A tape cassette having tape guides according to claim 1, wherein the tape guide material mixture comprises the polyethylene-based resin, the polyphenyl sulfide resin and additionally, carbon black.

5. A tape cassette having tape guides according to claim 4, wherein the mixing ratio of the polyphenyl sulfide resin is in a range of from 5 to 40 percent by weight.

6. A tape cassette having tape guides according to claim 4, wherein a mixing ratio of the carbon black falls in the range of 1 to 15 percent by weight.

7. A tape cassette having tape guides according to claim 4, wherein the surface electrical resistance of the tape guide material lies in the range of from $10^2$ to $10^{12}$ $\Omega$.

8. A tape cassette having tape guides comprised of a mixture of polyethylene-based resin whose molecular weight falls in the range of from 500,000 to 1,000,000 and polybutylene terephthalate resin.

9. A tape cassette having tape guides according to claim 8, wherein the mixture of the polyethylene-based resin and the polybutylene terephthalate resin further includes carbon black.

10. A tape cassette having tape guides according to claim 9, wherein a mixing ratio of the polybutylene terephthalate resin is in the range of from 5 to 40 percent by weight.

11. A tape cassette having tape guides according to claim 9, wherein the mixing ratio of the carbon black falls in the range of up to 15 percent by weight.

12. A tape cassette having tape guides according to claim 9, wherein surface electrical resistance of the tape guide material lies in the range of from $10^2$ to $10^{12}$ $\Omega$.

* * * * *